SYNCHRONIZING DEVICE FOR SOUND CINEMATOGRAPHY

Filed Jan. 5, 1959 3 Sheets-Sheet 1

INVENTOR
ROGER TRAINQUART
BY
MICHAEL S. STRIKER
ATTORNEY

April 26, 1966 R. TRAINQUART 3,248,163

SYNCHRONIZING DEVICE FOR SOUND CINEMATOGRAPHY

Filed Jan. 5, 1959 3 Sheets-Sheet 2

INVENTOR
ROGER TRAINQUART.

BY
MICHAEL S. STRIKER
ATTORNEY.

April 26, 1966 R. TRAINQUART 3,248,163

SYNCHRONIZING DEVICE FOR SOUND CINEMATOGRAPHY

Filed Jan. 5, 1959 3 Sheets-Sheet 3

INVENTOR.
ROGER TRAINQUART
BY MICHAEL S. STRIKER
ATTORNEY.

3,248,163
SYNCHRONIZING DEVICE FOR SOUND CINEMATOGRAPHY

Roger Trainquart, Poitiers, France, assignor, by mesne assignments, to Inventions Finance Corporation, a corporation of Delaware Filed Jan. 5, 1959, Ser. No. 784,960
2 Claims. (Cl. 352—15)

This invention relates to sound cinematography, and one of its objects is to permit synchronization between the rates of feed of a cinematographic film and a sound record medium, such as magnetic tape, separate from the film.

An object of the invention is to permit ready and accurate synchronization between picture and sound records occurring on separate media, i.e. a cinematographic film on the one hand, and a magnetic tape or the like on the other hand, and thereby to dispense with the need for a sound track on the film.

Another object of the invention is to provide apparatus for this purpose which will be applicable both for the recording and for the playing back of a sound record, and both in connection with an unexposed and an exposed film.

Various types of apparatus have already been proposed for maintaining accurate synchronism between the rates of feed of two separate record media, namely a film and a magnetic tape or the like, and such apparatus have generally included a variable impedance, e.g. a slidewire resistance, connected in circuit with the drive motor of the cinematographic (camera or projector) unit, and a displaceable member such as a slider arm cooperating with said variable impedance to vary the impedance value thereof, which member is displaced by direct actuation from the magnetic tape.

For this purpose, it has been customary to provide in the path of the magnetic tape a differential loop portion and means whereby the lengthening and shortening of the loop in response to variations in the rate of feed of the tape, would cause a displacement of said member to vary the impedance and hence vary the speed of the camera (or projector) motor in a sense to restore the desired synchronous relation between the feed rates.

Such arrangements of the prior art have suffered from various drawbacks. Thus, they impose substantial and objectionable loading on the magnetic tape due to the controlling action the tape has to exert on the variable resistance member or slider, thereby reducing the useful life of the tape. Moreover, such arrangements have required the provision of some type of mechanical connection, generally in the form of a flexible rotatable cable or the like, between the cinematographic unit and the magnetic recorder, and this has been cumbersome and impractical. The arrangement is complicated, and a variety of causes of malfunctioning and maladjustment are present, particularly due to the possible slippage of the magnetic tape over the rollers or pulleys about which it is trained for the formation of the differential loop in it.

Objects of this invention, therefore, are to eliminate these various defects and to provide improved, simplified, positive acting synchronizing apparatus of the type described.

In accordance with one aspect of the invention, there is provided in a sound cinematograph system comprising a sound unit having motor means for feeding a tape-like sound record medium and a cinematograph unit (i.e. camera or projector) having an electric motor for feeding a cinematograph film, an arrangement for synchronizing the feed rates of said record medium and film comprising, variable impedance means, such as a slidewire resistance, connected in circuit with said electric motor and including a displaceable member, e.g. a slider arm, for varying the impedance value thereof; a pair of differentially shiftable, and independently rotatable elements, such as a screw element and a nut element one of which is axially shiftable relatively to the other, means connected with one of said elements (e.g. the screw element) and with said sound unit for rotating said one element at a rate corresponding to the rate of feed of said medium, means connected with said other element (e.g. the nut) and with said cinematograph unit for rotating said other element at a rate corresponding with the rate of feed of said film, a differential axial shift occurring between said elements on departure of the ratio between said feed rates from a prescribed synchronous value, and means connecting said variable impedance member with one of said elements, e.g. the nut element, to displace said member on occurrence of a differential shift and in a sense to restore synchronism between said feed rates.

A preferred form of embodiment of the invention and exemplary modifications thereof will now be described for purposes of illustration but not of limitation with reference to the accompanying drawings, wherein.

Figure 1:
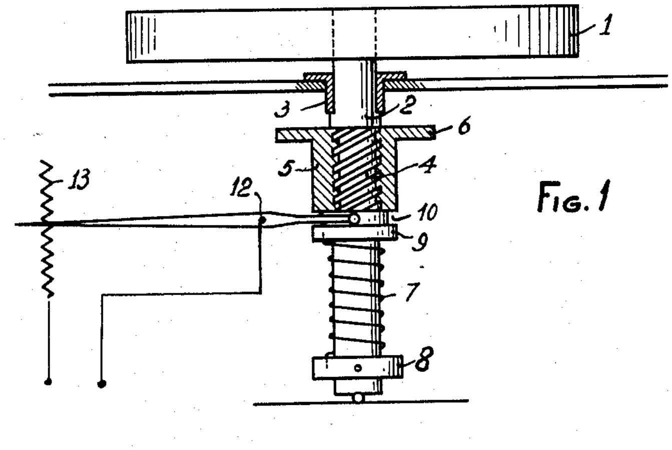
FIG. 1 is a simplified view in elevation, with parts in axial section and parts in schematic form, of one embodiment of the synchronizing arrangement, wherein said differentially related elements comprises a screw element and a nut element.
Figure 2:
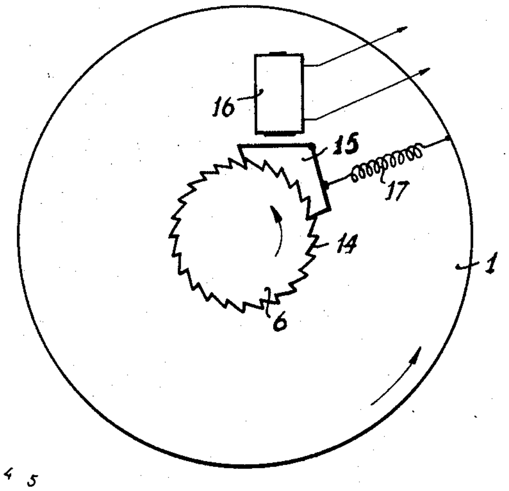
FIG. 2 is a plan view of FIG. 1.

In the exemplary embodiment shown in FIGS. 1 and 2, synchronizing apparatus according to the invention comprises a pulley 1 secured on one end of a shaft 2 journalled in a bearing 3. Formed over a section of a length of the shaft is a high-pitch screw thread 4 which may include only a small number of threads, e.g. four or five as shown. A nut member 5 cooperates with the threaded shaft section 4 and is formed with a flange 6 at its upper end. The bottom end of the nut is formed with an annular groove 10 defining a bottom flange 9, and an helical spring 7 surrounding the shaft 2 below the nut acts between the bottom surface of flange 9 and a flange 8 secured to the shaft 2. The spring 7 acts both in compression and in torsion so as to urge the nut in an upward direction around the threaded shaft section.

Engaging the groove 10 in the nut is one end of an index lever 11 pivoted at an intermediate point at 12 and having its opposite end frictionally engaging an electric resistance 13 such as a slide-wire or the like, which may be connected in series in the supply circuit of the drive motor of a cinematographic camera or projector apparatus.

The upper flange 6 of nut 5 is formed throughout its periphery with ratchet teeth 14 as shown in FIG. 2, which are engaged by the spaced pawl arms of a pivoted escapement member 15 which is urged in one angular direction by a tension spring 17 and which may be actuated in the opposite angular direction by energization of the winding of an electromagnet 16 cooperating with one of the pawl arms of member 15.

It will be understood that the pulley 1 is driven from the magnetic recorder tape at a substantially uniform linear speed, for which purpose the magnetic tape may be made to surround the pulley periphery in frictional engagement therewith either ahead of or beyond the reel of the magnetic recorder device. Further, the winding of electromagnet 16 is connected in an energizing circuit including a switch operated by the film feed movement of the camera or projector in a manner to be presently apparent, so as to supply energizing voltage pulses to the electromagnet 16 at a rate proportional to the rate of feed of the film. The system then operates as follows:

So long as the linear rate of advance of the magnetic tape is in a constant predetermined ratio with the rate of advance of film through the motion-picture camera or projector, the nut 5 retains a stationary position on the threaded shaft section 4 so that the index 11 is likewise held stationary in engagement with an unchanging point of slidewire resistance 13. The speed of operation of the camera or projector motor therefore remains unchanged, and the synchronism present between the picture and sound records is retained.

An out-of-synchronism condition may be introduced between the magnetic record and the film for any reason as a result either of an acceleration or a deceleration in the rate of film feed through the camera or projector device. If the film has accelerated, the energizing circuit of electromagnet 16 is switched on and off at more frequent intervals, so that the rate of rotation of the nut 5 is increased over that of the shaft 2, and the nut therefore is shifted in one direction displacing the tip of slider 11 across the slidewire 13 in a direction such as to increase the value of resistance inserted in the motor supply circuit. The motor thereupon is slowed down until the predetermined velocity ratio corresponding to synchronism has been restored. If on the other hand the lack of synchronism is due to a deceleration of the film, the rate of energizing pulses supplied to the electromagnet 16 is correspondingly slowed down and the nut 5 is rotated at a slower speed than is the shaft 2 whereupon it is shifted in the reverse direction from that mentioned above and the motor supply circuit resistance is reduced to speed up the motor and thereby again restore synchronism.

Figure 3:
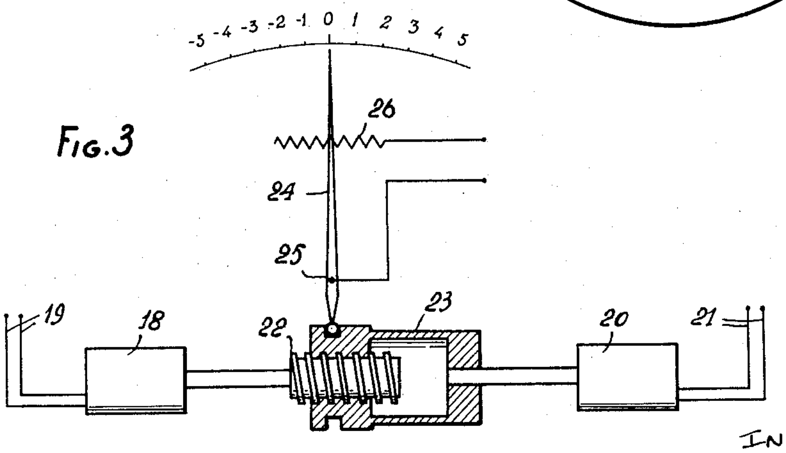
FIG. 3 is a simplified showing of a modified form of the invention also employing a screw and a nut element.

In the embodiment illustrated in FIG. 3, the components respectively driven in response to the magnetic tape and the film comprise a step-by-step motor 18 connected in the motor supply circuit 19 of the magnetic unit, and a similar step-by-step motor 20 connected in the motor supply circuit 21 of the motor of the cinematographic unit. As shown, motor 18 rotates a screw shaft 22 meshing with a nut 23 which in turn is driven from motor 20. The nut 23 is arranged in a manner generally similar to that shown in FIG. 1 to actuate a slider 24 pivoted at 25 and engaging a slidewire resistance 26 connected in series with the supply circuit of the cinematographic unit.

In this embodiment, when with both motors 18 and 20 rotated at a common speed, nut 5 remains stationary on screw 22, while in case of a difference between the speeds of the motors, nut 23 shifts one way or the other with respect to screw 22, causing a displacement of slider 24 along resistance 26 to produce an increase or a decrease in the speed or rotation of the motor driving the cinematographic camera or projector so as to restore synchronism.

Figure 4:
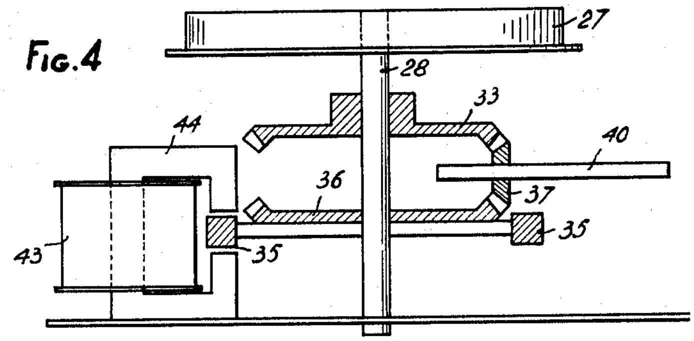
FIG. 4 is a simplified view in elevation and axial section illustrating a modified and preferred embodiment of the invention, utilizing differential gearing as the differential mechanism therein.
Figure 5:
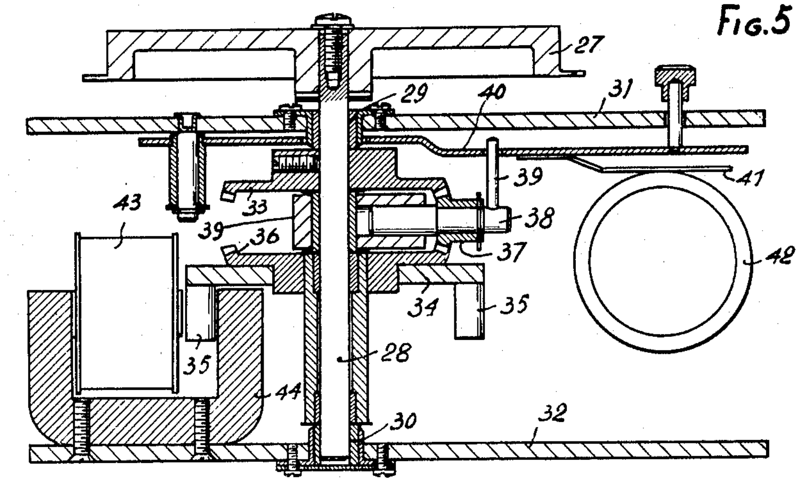
FIG. 5 is a more detailed view similar to FIG. 4 illustrating additional features of construction thereof.
Figure 6:
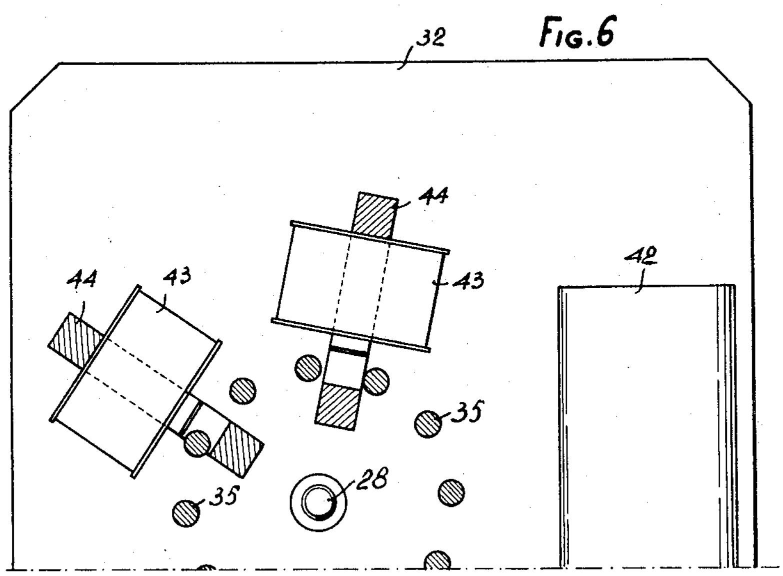
FIG. 6 is a partial plan view of FIG. 5 from below.

FIGS. 4 to 6 illustrate a preferred form of embodiment of the invention, wherein there is provided a pulley 27 engaged by the magnetic tape and secured on one end of a shaft 28 freely rotatable in bearings 29 and 30, respectively in the upper platen 31 and the bottom platen 32 of the apparatus frame. Secured on the shaft 28 is a bevel gear 33. The shaft 28 further carries a rotatable disc 34 having a uniformly spaced set of magnetic core members 35 secured to its periphery. Secured to the disc 34 is a bevel gear 36 similar to gear 33.

Meshing with both gears 33 and 36 in planetary fashion is a pinion 37 freely rotatable on an axle 38 carried by a planetary carrier ring or cage 39 which is freely rotatable on shaft 28. The shaft 38 at its free end has a finger 39 projecting from it and into a hole formed in a slider member 40 so mounted as to be freely rotatable around the shaft 28. Slider 40 carries a contact strip 41 on its bottom face engaging a drum-round slidewire resistor 42 connected in the supply circuit of the motor driving the cinematographic unit.

A plurality of solenoids such as 43 are uniformly spaced around the disc 32 and cooperate with electromagnet armatures 44 between which the magnetic core members 35 are arranged to pass during rotation of the rotatable assembly. The electromagnet windings or solenoids are connected in energizing circuits which are adapted to be completed at intermittent periods by a switching device disposed in the path of the film feed through the cinematographic unit.

As in the previously described embodiments, the speed of rotation of gear 33 depends on the linear rate of advance of the magnetic tape, while the speed of gear 36 depends directly on the linear rate of advance of the cinematographic film. With both said rates of advance remaining constant so that the prescribed ratio is maintained between them, the slider 40 remains stationary. However, any alteration in said speed ratio in either sense causes a corresponding displacement of slider 40 which, due to the existing contact between the strip 41 and the resistor 42, maintains the speed of rotation of the camera or projector drive motor at an accurately uniform value, resulting in the maintenance of strict synchronism between the pictures and sound record.

In all of the forms of embodiment described, mechanical connections between the synchronizing device, the magnetic recording and play-back unit and the cinematographic camera or projector unit, are completely dispensed with, thus eliminating sources of malfunction and increasing the reliability in the operation of the system, as well as making it unnecessary to modify in any way the existing units of apparatus, and in particular the cinematographic camera or projector unit.

It will be understood that various modifications and improvements in the details of the systems described may be conceived within the scope of the invention without exceeding the scope of the invention.

What I claim is:

1. An accessory device for synchronizing an electrical motor driven cinematograph unit and a separate motor driven sound recording and reproducing unit comprising a shaft, means for driving said shaft at a rate corresponding to the operational speed of said sound unit, a first sun gear connected to said shaft to be driven thereby, a second sun gear differentially displaceable with respect to said first sun gear and mounted for rotation about said shaft, electro-magnetic means arranged to rotate said second sun gear in accordance with electric pulses received from said cinematograph unit, at a rate corresponding to the operational film speed of the cinematograph unit, a variable impedance means connectable in series with the field winding of the electric drive motor of said cinematograph unit, a displaceable member for engaging said variable impedance means to vary the impedance thereof, and means comprising a planet carrier and a planet gear rotatable on said carrier and meshed with both said sun gears, whereby a differential shifting of the relative positions of said sun gears will move said displaceable member in a sense to restore synchronism between the operational speeds of said cinematograph and sound units; said planet carrier comprising a stub axle journaled in a bushing mounted for rotation about said shaft.

2. An accessory device for synchronizing a cinematograph unit and a sound recording and reproducing unit as described in claim 1 wherein said electro-magnetic means arranged to rotate said second sun gear comprises a support disc keyed to said second sun gear, a plurality of spaced magnetic cores on said disc cooperating with a plurality of stationary electro-magnets to impart a rotation to said disc and gear on sequential energization of the electro-magnets, and energizing circuit means connecting said electromagnets and said cinematograph unit for sequentially energizing and de-energizing said electromagnets in accordance with the rate of feed of said film.

References Cited by the Examiner

UNITED STATES PATENTS

| | | | |
|---|---|---|---|
| 1,985,552 | 12/1934 | Ross | 352—13 |
| 2,099,987 | 11/1937 | Murdock | 226—42 |
| 2,212,192 | 8/1940 | Howell | 310—156 |
| 2,671,882 | 3/1954 | Page | 310—156 X |
| 2,932,235 | 4/1960 | Ochiai | 352—17 |
| 2,993,406 | 7/1961 | Straub | 352—16 |

FOREIGN PATENTS

| | | |
|---|---|---|
| 695,049 | 9/1930 | France. |
| 1,143,432 | 4/1957 | France. |
| 1,144,716 | 4/1957 | France. |
| 659,521 | 5/1938 | Germany. |
| 333,655 | 8/1930 | Great Britain. |

NORTON ANSHER, *Primary Examiner.*

EMIL G. ANDERSON, WILLIAM MISIEK, *Examiners.*